Sept. 21, 1948.    W. S. WHITE    2,449,573
SAFETY DEVICE FOR FLUID SUPPLY LINES
Filed Aug. 31, 1943    2 Sheets-Sheet 1

WILLIAM SEARS WHITE
INVENTOR.

BY *H. A. McGraw*
ATTORNEY

Sept. 21, 1948.     W. S. WHITE     2,449,573
SAFETY DEVICE FOR FLUID SUPPLY LINES
Filed Aug. 31, 1943     2 Sheets-Sheet 2

WILLIAM SEARS WHITE
INVENTOR.

BY
ATTORNEY

Patented Sept. 21, 1948

2,449,573

UNITED STATES PATENT OFFICE 2,449,573

SAFETY DEVICE FOR FLUID SUPPLY LINES

William Sears White, Denver, Colo.

Application August 31, 1943, Serial No. 500,624

6 Claims. (Cl. 277—60)

This invention relates to safety devices for fluid supply lines and more particularly to safety devices known as vacuum breakers, which are normally associated with flush valves controlling the flow of fluid to a plumbing fixture. As used in this description and the appended claims, "fluid" includes both air and water.

When a plurality of plumbing fixtures, particularly sanitary fixtures such as toilets, urinals and the like, are flushed by fluids such as water originating from a common source, and particularly when a plurality of such fixtures are installed in a relatively tall building, there is a possibility of the fixtures on lower floors draining all of the available supply of flushing water from the upper floors and creating a vacuum or sub-atmospheric pressure in the lines on the upper floors. When a flush valve supplying one of the fixtures on an upper floor, for instance, is actuated, instead of water under pressure being supplied to the fixture, the water in the fixture is drawn into the supply line by the vacuum or sub-atmospheric pressure. Obviously, when a portion of the contents of the sanitary fixture are drawn into a water line which supplies not only other sanitary fixtures but also taps or the like supplying water for drinking, bathing and other personal uses, there is extreme danger of a spread of infection, disease, and a consequent menace to the public health.

The present invention is an improvement on the construction disclosed and claimed in my U. S. Patent No. 2,183,601, granted December 19, 1939. In my former construction, an upwardly inclined passage having an opening communicating with the atmosphere was formed in the casing of a flush valve, adjacent the outlet thereof. A piston valve disposed in the passage was normally open, thus connecting the outlet side of the flush valve with the atmosphere. When the flush valve was opened, the flow of water through the outlet impinged against a hinged plate bifrucated at both ends. One end of the plate surrounded the stem of the flush valve, while the other end of the plate surrounded the end of the valve. When water impinged upon the end of the plate disposed within the flush valve outlet, the plate pivoted, and closed the air port.

Among the objects of this invention are to provide a safety device or vacuum breaker for supply lines, particularly to sanitary fixtures; to provide such a device in which a back flow of water between the plumbing fixture and the supply line is positively checked; to provide such a device in which one or more check valves are normally maintained in close proximity to their seats; to provide a quick seal for each seat, irrespective of other check valves in the device; to provide such a device in which the number of wearing parts, such as toggle pins and the like, is reduced to a minimum; to provide such a device in which undue pressure of a check valve on its seat is eliminated; to provide such a device in which a free movement of a check valve away from its seat is obtained, to provide for the free inlet of air and a relatively unrestricted flow of flushing water through the line; and to provide such a device which is durable and inexpensive.

Other objects and novel features will become apparent from the following description.

In accordance with this invention, a safety device for a fluid system which includes a flush valve disposed in a line leading to a plumbing fixture, comprises two or more ports located in a restricted portion of the line passage between the flush valve and the fixture. A flexible valve means, formed of metal, rubber, or the like, is provided for closing each of the ports. Preferably, one port communicates with the atmosphere and a second port is disposed between the inlet and outlet and water on its way from the flush valve to the fixture flows through the second port; or, both ports communicate with the atmosphere and a separate valve construction is provided through which water passes on its way from the flush valve to the fixture. The ports and the valve closures therefor are preferably so constructed and arranged that water in passing from the flush valve through the line will close the air port or ports, and the water port or valve is closed positively should there be a back flow of fluid in a direction from the fixture toward the flush valve. The device may be formed in a relatively simple casing, as will appear hereinafter, but it will be understood that the device may be incorporated in the casing of the flush valve itself, on the outlet side.

The above device may be embodied in the various arrangements of parts set forth in the following description, taken in connection with the accompanying drawings, in which.

Figure 1:
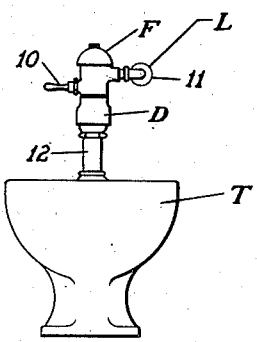
Fig. 1 is a front elevation of a sanitary plumbing fixture and a supply line thereto, including a flush valve and a safety device constructed in accordance with this invention.

As illustrated in Fig. 1, a safety device D constructed in accordance with this invention may be interposed in the supply line L between a flush valve F having an operating handle 10, and a sanitary plumbing fixture such as a toilet T. Such flush valves are usually opened by a manually actuated lever, and the valve therefor operates automatically to deliver a measured flow of water to a fixture to be flushed, the valve automatically closing at the end of the flushing period.

Water is supplied through a high pressure pipe 11 to the flush valve F and, after passing through the safety device, is discharged into the toilet through a pipe 12. The flush valve F may be of any normal construction adapted, when the handle 10 is moved in any direction from its straight extended position, to permit a measured quantity of water to flow into the toilet T. As explained previously, the safety device may be a separate part, attached to the outlet end of the flush valve, or may be incorporated in the flush valve itself, at the outlet end thereof. Flush valve F may be similar in interior construction to the flush valve disclosed in my U. S. Patent No. 2,183,601, or any other desired operable construction.

Figure 2:
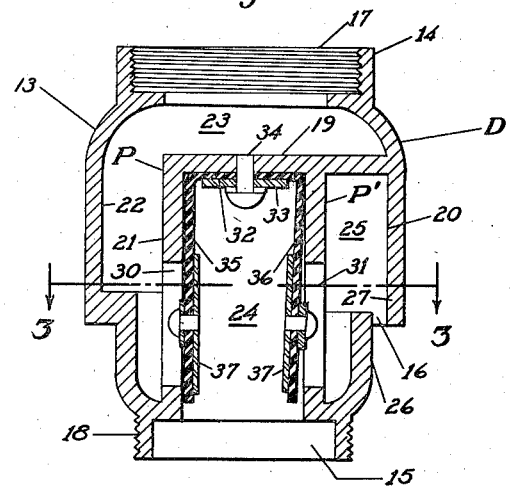
Fig. 2 is a longitudinal section of the safety device of Fig. 1.
Figure 3:
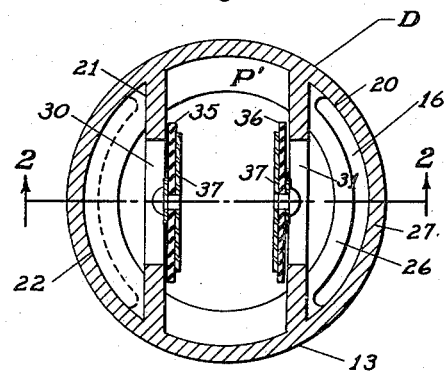
Fig. 3 is a cross section taken along line 3—3 of Fig. 2, of the safety device.

As in Figs. 2 and 3, the safety device D may comprise an outer shell or casing 13 having a water inlet 14, a water outlet 15 and an air orifice 16. The inlet 14 may be provided with interior threads 17 for connection of the device to the flush valve, and the outlet 15 may be provided with exterior threads 18 for connection to a coupling or collar of pipe 12. Within the casing 13 is a partition P, an upper leg 19 of which extends inwardly from one wall 20 toward the opposite wall 22 of casing 13, and a vertical leg 21 of which extends downwardly to a point adjacent outlet 15, there connecting with opposite wall 22. A second partition P' extends from a central portion of leg 19, downwardly to a point adjacent the outlet, there connecting with wall 20 of the casing.

Above and to the left of partition P is formed an inlet chamber 23, into which water flows when the flush valve is opened. Between the partitions P and P' is formed an outlet chamber 24 communicating with pipe 12. On the side of partition P' opposite outlet chamber 24 is formed an air chamber 25 through which communication is provided to air orifice 16. The air orifice 16 is preferably formed between an inner lower lip 26, and an outer upper lip 27, the lower lip serving to collect any small amount of fluid which may be discharged into the air chamber 25.

The downwardly extending vertical leg 21 of partition P is provided with a port 30, through which water flows in passing from the inlet to the outlet, and thence to the sanitary fixture. The partition P' is similarly provided with a port 31, adapted to permit air to flow into outlet chamber 24, and thereby prevent siphonage from the sanitary fixture, when a sub-atmospheric pressure, for any reason, is created anywhere in the line. Vertical leg 21 of partition P and partition P' are preferably disposed in parallel relation, as shown, and ports 30 and 31 are preferably disposed in alinement, directly opposite each other on the sides of outlet chamber 24 which forms a restricted portion of the passage through the supply line.

Ports 30 and 31, if desired, may be closed by a substantially unitary valve means, as shown, which comprises a U-shaped element 32 formed of rubber, metal, or any other suitable material. As in Figs. 1 and 2, the element 32 is formed of rubber, and attached to the underside of horizontal leg 19 of partition P in any suitable manner, such as by a plate 33 and a screw 34. Each of the valve closing legs or flaps 35 and 36 of element 32 acts as a check valve and is adapted to swing inwardly in opening its respective port, leg 35 normally being in closed position against port 30 and leg 36 normally being slightly spaced from port 31 or partially open. To minimize the tendency for collapse of the rubber, and its being forced through one of the ports by interior pressure, each leg may be reinforced by a metal disk 37 corresponding in shape but slightly larger than the ports 30 and 31, and securely attached to the respective leg of element 32 in a suitable manner, as by riveting.

When flush valve F is opened to supply flushing water to the sanitary fixture, the water immediately fills inlet chamber 23, and forces leg 35 of element 32 inwardly, thus opening port 30 and permitting the water to flow to the sanitary fixture. Water passing into chamber 24 also forces leg 36 against air port 31, so that no leakage of the flushing water through air orifice 16 will occur.

When the required amount of water for flushing has passed through the safety device, the legs of element 32 will swing back to the closed position shown. In case there is a vacuum or subatmospheric pressure in the supply line ahead of flush valve F, when the flush valve is opened such vacuum will immediately cause the left leg 35 to be drawn tightly against its port 31, and any vacuum or sub-atmospheric pressure produced in the outlet chamber will cause the right leg 36 to swing inwardly, thereby further opening port 31 and permitting air to be sucked into the outlet chamber, thus relieving the vacuum. If, for any reason, water is drawn from the sanitary fixture, into outlet chamber 24, the pressure of the water will close left leg 35 more tightly against port 30, and also tend to close right leg 36 against port 31.

Figure 6:
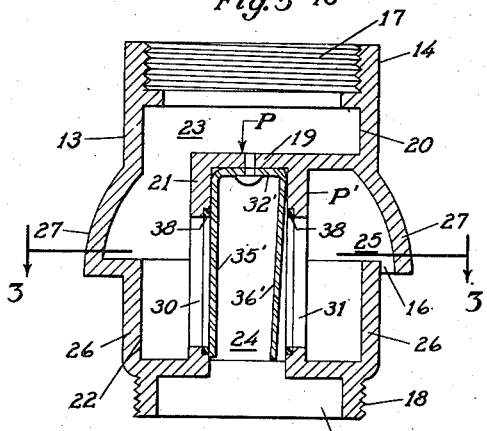
Fig. 6 is a longitudinal section of a safety device similar to that of Figs. 1 to 3 inclusive, but in which different materials have been utilized for the check valves.

The operation of the construction disclosed in Fig. 6 is identical with that just described. The only difference between the construction of Fig. 6 and that of Figs. 2 and 3 is that element 32' of Fig. 6 is made of flexible metal or the like, and thus requires no reinforcing disks. The metal may be secured to the partition by a screw, as shown, or in any other suitable manner, as by resistance welding. To provide a more perfect seal, a sealing ring 38, against which legs 35' and 36' of element 32' press, may surround ports 30 and 31. Such sealing rings may be formed of rubber or any other suitable valve seat material. Also, the legs 35' and 36' may be coated with rubber or the like over the port area, to provide a better seal.

Figure 4:
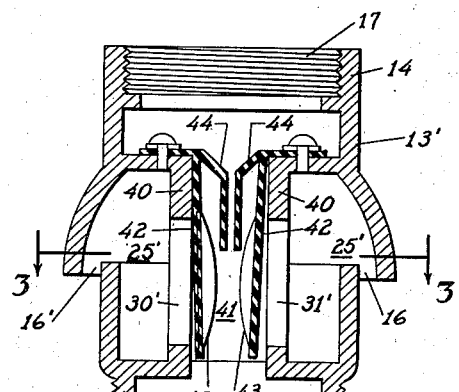
Figs. 4 and 5 are longitudinal sections of alternative constructions, comprising additional embodiments of a safety device constructed in accordance with this invention.
Figure 5:
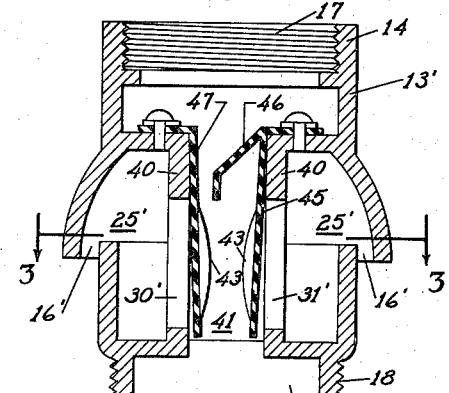

In the construction illustrated in Figs. 4 and 5, two air orifices 16' are provided, on opposite sides of the casing 13', as well as two air chambers 25', with one of which each of ports 30' and 31' communicates. Instead of flowing to one side, as in the previous construction, the water flows centrally through the device, a pair of upright channel shaped partitions 40 providing a restricted portion 41 of the passage through the line. Ports 30' and 31' are disposed in the upright legs of partitions 40, and are preferably in direct alinement opposite each other, as in the previous construction.

In the construction shown in Fig. 4, each port is normally covered by a flap or check valve 42 fastened at the top of each partition in any suitable manner, and extending downwardly over the port. These valves may be made of any suitable material, such as rubber or the like, and may be provided with reinforcing disks 43 embedded in the rubber as shown, although they may be attached thereto in the same manner as the disk 37 of Figs. 1 and 2, and vice versa.

In addition to the flap or check valves 42, which are forced against the ports upon passage of water through the device, each flap is provided with an inwardly and downwardly extending lip 44, the two lips cooperating together to permit water to pass through them from the flush valve. Lips 44 are drawn upwardly and in close engagement with each other, to act as a check valve and seal off the sanitary fixture, in case of a vacuum or sub-atmospheric pressure somewhere in the line which would tend to siphon the contents of the fixture when the flush valve is opened. Any vacuum, of course, in the restricted portion 41 or between the device and the fixture will pull the flaps 42 further open, thus admitting air into the line to break the vacuum. Also, a partial vacuum which does not completely close lips 44 will further open the flaps 42, to assist in breaking the vacuum. Disks 43 may be rounded as shown, extending slightly into the passage, so that when the flaps are pulled open by a vacuum, the disks tend to squeeze the lips 44 between them and thus cause a more effective seal against the sub-atmospheric pressure in the line ahead of the device.

The construction illustrated in Fig. 5 is similar to that illustrated in Fig. 4, except that one flap 45 is provided with a lip 46 which extends downwardly and across the restricted passage portion 41 almost to the other side, and the other flap 47 is not so provided. When the flush valve is opened to admit water into inlet 14, the pressure of the water forces the lip 46 backwardly, and closes flaps 45 and 47 against the ports. If, when the flush valve is opened, a vacuum or sub-atmospheric pressure exists in the line, lip 46 will be pulled upwardly and across the restricted portion of the passage to act as a check valve and seal the line from the fixture. At the same time, the flaps 45 and 47 will be pulled further inwardly, to admit air through orifices 16' and break the vacuum.

The advantages of the foregoing constructions are many and varied. The resilient flaps or check valves require no hinge pins and are always normally located in close proximity to their seats, so that a quick seal may always be provided for each seat. In addition, there is substantial freedom of movement of each check valve, so that it may open quickly either when flushing water is to flow through a port which it controls or air to break a vacuum is to be drawn into the device. An outstanding feature of the foregoing constructions is the fact that a positive back flow seal is provided between the device and the line ahead of the same, while at the same time a free and uninterrupted opening of the check valve or valves permitting the inflow of air is provided.

The casing or shell of the device may be made of brass, bronze, iron or any other suitable casting material, or made by die casting, powder metallurgy, or in any other suitable manner. While the check valves and flaps have been disclosed to be made of rubber or resilient metal, it will be understood that other materials, such as synthetic rubbers of the Neoprene or other types, resins of the styrene or other types more highly resistant to cold flow, and many other materials, such as phosphor bronze and the like, may be utilized.

Although certain embodiments of this invention have been described, it is to be understood that these are illustrative only, and that numerous modifications may be made, such as incorporating the device in the flush valve itself, all without departing from the spirit and scope of this invention as defined in the appended claims.

What is claimed is:

1. A safety device, for a fluid system of the type which includes a flush valve disposed in a line leading to a plumbing fixture, comprising a casing having an inlet and an outlet; a partition in said casing between said inlet and outlet and having a port therein; a second partition disposed between said outlet and a chamber leading to an opening in said casing communicating with the atmosphere, said second partition having a port therein; and means for closing said ports comprising a U-shaped strip of flexible material extending over said ports within said outlet portion and fastened to one of said partitions at a point between said ports.

2. A safety device as defined in claim 1, in which each leg of said U-shaped flexible strip is provided with a metal reinforcing disk disposed on the side opposite that which contacts a port.

3. A safety device, for a fluid system of the type which includes a flush valve disposed in a line leading to a plumbing fixture, comprising a casing having an opening communicating with the atmosphere; a partition extending from one wall of said casing, partially across the interior thereof, thence downwardly and to the opposite wall thereof to provide an inlet chamber adjacent said opposite wall, said downwardly extending portion of said partition having a port therein; a second partition extending from the upper portion of said first partition downwardly to a point spaced therefrom and thence to said first wall and having a port therein opposite said first mentioned port, said second partition and said first wall forming a chamber and said first wall having an opening providing communication between said chamber and the atmosphere; and valve means for closing said ports comprising a U-shaped strip of flexible metal fastened to said first partition between the downwardly extending portions of said partitions, each leg of said strip extending downwardly across one of said ports.

4. A safety device as defined in claim 3, in which each of said ports is provided with resilient seating material against which said flexible metal is adapted to seat.

5. A vacuum breaking device for a fluid supply system comprising a casing having a fluid inlet and a fluid outlet, partition means providing a passage between said inlet and said outlet and having a port providing communication between the passage and the atmosphere outside said casing, and valve means comprising a unitary member of flexible material having a first flat check valve portion for preventing back flow of fluid from said passage to said inlet and a second flat check valve portion for preventing flow of fluid from said passage through said port to the atmosphere, said first check valve portion being arranged to open and permit normal flow of fluid from said inlet to said outlet and said second check valve portion being arranged to uncover said port and open said passage to the atmosphere upon the occurrence of a sub-atmospheric pressure therein.

6. A vacuum breaking device for a fluid supply system comprising a casing having a fluid inlet and a fluid outlet, partition means providing a passage between said inlet and said outlet and having a port providing communication between the passage and the atmosphere outside said casing, and valve means comprising a unitary member of flexible material secured to said partition means and having a first flat check valve portion for preventing back flow of fluid from said passage to said inlet and a second flat check valve portion for preventing flow of fluid from said passage through said port to the atmosphere, said first check valve portion being arranged to open and permit normal flow of fluid from said inlet to said outlet and said second check valve portion being arranged to uncover said port and open said passage to the atmosphere upon the occurrence of a sub-atmospheric pressure therein, said second check valve portion being arranged normally to lie in a position to maintain said port slightly open.

WILLIAM SEARS WHITE.

REFERENCES CITED

The following references are of record in the file of this patent:

UNITED STATES PATENTS

| Number | Name | Date |
| --- | --- | --- |
| 103,738 | Hamilton | May 31, 1870 |
| 314,107 | Chappell | Mar. 17, 1885 |
| 2,021,342 | Wesson | Nov. 19, 1935 |
| 2,033,935 | Robinovitz | Mar. 17, 1936 |
| 2,174,742 | Groeniger | Oct. 3, 1939 |
| 2,199,307 | Eichelberg | Apr. 30, 1940 |
| 2,253,410 | Work | Aug. 19, 1940 |
| 2,277,295 | Brown | Mar. 24, 1942 |
| 2,292,003 | Yant | Aug. 4, 1942 |
| 2,328,382 | Langdon | Aug. 31, 1943 |
| 2,347,199 | Langdon | Apr. 25, 1944 |